US008806933B2

(12) United States Patent
Kohno et al.

(10) Patent No.: US 8,806,933 B2
(45) Date of Patent: Aug. 19, 2014

(54) THERMAL TYPE AIR FLOW METER

(75) Inventors: Yasushi Kohno, Obu (JP); Hiromi Ariyoshi, Kariya (JP)

(73) Assignee: Denso Corporation, Kariya (JP)

( * ) Notice: Subject to any disclaimer, the term of this patent is extended or adjusted under 35 U.S.C. 154(b) by 380 days.

(21) Appl. No.: 13/438,148

(22) Filed: Apr. 3, 2012

(65) Prior Publication Data

US 2012/0247202 A1 Oct. 4, 2012

(30) Foreign Application Priority Data

Apr. 4, 2011 (JP) .................................. 2011-82359

(51) Int. Cl.
*G01F 1/68* (2006.01)
*G01F 1/684* (2006.01)
*G01F 1/699* (2006.01)

(52) U.S. Cl.
CPC .............. *G01F 1/699* (2013.01); *G01F 1/6842* (2013.01)
USPC ..................................... 73/204.15; 73/204.26

(58) Field of Classification Search
None
See application file for complete search history.

(56) References Cited

U.S. PATENT DOCUMENTS

| 5,369,994 A | 12/1994 | Hecht et al. |
| 2004/0069061 A1 | 4/2004 | Watanabe et al. |
| 2013/0055801 A1* | 3/2013 | Kohno et al. ............... 73/114.34 |

* cited by examiner

*Primary Examiner* — Harshad R Patel
(74) *Attorney, Agent, or Firm* — Nixon & Vanderhye PC

(57) ABSTRACT

A thermal type air flow meter, which detects a flow rate of air flowing in an air passage, includes a sensor portion having a heating element in an air passage, a temperature control unit. The temperature control unit includes a first arm serially connecting a first resistive element and a heater temperature detection resistor which detects a temperature of the heating element, a second arm serially connecting a second resistive element and an air temperature detection resistor which detects a temperature of air flowing in the air passage, and a voltage supply unit which supplies first and second voltages respectively to the first and second arms. The voltage supply unit includes a voltage adjusting portion which can adjust at least one of the first and second voltages such that the detection temperature difference between the heater temperature detection resistor and the air temperature detection resistor becomes constant.

6 Claims, 9 Drawing Sheets

THERMAL TYPE AIR FLOW METER

CROSS REFERENCE TO RELATED APPLICATION

This application is based on and incorporates herein by reference Japanese Patent Application No. 2011-082359 filed on Apr. 4, 2011.

TECHNICAL FIELD

The present disclosure relates to a thermal type air flow meter which measures a flow rate of air supplied to an internal combustion engine of a vehicle, for example.

BACKGROUND

Conventionally, a thermal type flow meter is known, which measures a flow rate of fluid such as air or gas. The thermal type flow meter includes a heating element heated to a base temperature higher than a temperature of the fluid by a predetermined degree, an upstream temperature sensitive resistive element arranged upstream of the heating element in a flow direction of the fluid, and downstream temperature sensitive resistive element arranged downstream of the heating element in the fluid flow direction. The thermal type flow meter measures a flow rate of the fluid based on a detection temperature difference between the upstream and downstream temperature sensitive resistive elements, and further includes a bridge circuit which controls a temperature of the heating element to be the base temperature. For example, in JP06-160142A (corresponding to U.S. Pat. No. 5,369,994), as shown in FIG. 10, two bridge arms are connected in parallel between a power feed terminal 100 and a ground terminal 110. One of the bridge arms includes a temperature sensitive resistive element 130 which detects a temperature of a heating element 120, and an adjustable resistive element 140 resistance value of which is adjustable. The temperature sensitive resistive element 130 and the adjustable resistive element 140 are connected in series. The other one of the bridge arms includes a temperature sensitive resistive element 150 which detects a temperature of fluid, an adjustable resistive element 160 resistance value of which is adjustable, and a fixed resistive element 170 resistant value of which is fixed are connected. The temperature sensitive resistive element 150, the adjustable resistive element 160 and the fixed resistive element 170 are connected in series. A fixed voltage is applied between the power feed terminal 100 and the ground terminal 110. The adjustable resistive elements 140, 160 are made from thick films on a support, and resistance values of the adjustable resistive elements 140, 160 are adjusted such that a detection temperature difference between the temperature sensitive resistive elements 130, 150 becomes approximately constant.

In JP3817497 (corresponding to US2004/0069061), as shown in FIG. 11, two bridge arms of a bridge circuit are connected in parallel between a power feed terminal 200 and a ground terminal 210. One of the bridge arms includes a temperature sensitive resistor 230, which detects a temperature of heating element 220, and another temperature sensitive resistor 240, and the resistors 230, 240 are connected in series. The other one of the bridge arms includes a temperature sensitive resistor 250, which detects a temperature of fluid, and another temperature sensitive resistor 260, and the resistors 250, 260 are connected in series. A fixed voltage is applied between the power feed terminal 200 and the ground terminal 210. The four temperature sensitive resistors 230, 240, 250, 260, which constitute the bridge circuit, are made of the same material by the same process, and have almost same temperature coefficients.

In JP06-160142A, the detection temperature difference between the temperature sensitive resistors 130, 150 is adjustable by controlling resistance values of the resistors 140, 160 individually. However, because the adjustable resistors 140, 160 occupy a relatively large area on a circuit, the circuit may become large. Moreover, thick film resistors are generally trimmed by using laser or the like, so that an expensive equipment for laser trimming is required Additionally, thick film resistors are required to be protected with a silicone gel or the like and then to be covered with a cover after trimming. Thus, characteristics of thick film resistors may be changed in the protection and cover processes after trimming. As a result, a production process of thick film resistors may be complicated, and production equipments of thick film resistors may be expensive.

In JP3817497, the four temperature sensitive resistors 230, 240, 250, 260, which constitute the bridge circuit, are made of the same material by the same process, and have almost same temperature coefficients. Thus, a variation in a detection temperature difference between one another is relatively small without controlling resistance values of the resistors 140, 160 individually as in JP06-160142A. However, the four temperature sensitive resistors 230, 240, 250, 260 are actually different from one another in shape, temperature, and position on a sensor element. Hence, the detection temperature differences between one another are required to be adjusted individually in order to provide a high accuracy measurement of flow rate. The conventional technology described in JP3817497 does not have an adjusting function and is not capable of measuring a flow rate with high accuracy.

SUMMARY

According to the present disclosure, there is provided a thermal type air flow meter adapted to be attached to a duct. The air flow meter includes a sensor portion, a temperature control unit and a flow rate detection unit. The sensor portion is arranged in an air passage in the duct through which air flows, and includes a heating element configured to produce heat by energization thereof. The temperature control unit is configured to control a temperature of the heating element such that a temperature difference between the temperature of the heating element and a temperature of air flowing in the air passage becomes constant. The temperature control unit includes a heater temperature detection resistor configured to detect the temperature of the heating element, a first resistive element, a first arm serially connecting the heater temperature detection resistor and the first resistive element, an air temperature detection resistor configured to detect the temperature of air flowing in the air passage, a second resistive element, a second arm serially connecting the air temperature detection resistor and the second resistive element, and a voltage supply unit configured to supply a first voltage to the first arm and to supply a second voltage to the second arm. The flow rate detection unit is configured to detect a flow rate of air flowing in the air passage based on a heat radiation amount from the heating element. The voltage supply unit includes a voltage adjusting portion which is capable of adjusting at least one of the first voltage and the second voltage such that the temperature difference between the temperature detected by the heater temperature detection resistor and the temperature detected by the air temperature detection resistor becomes constant.

BRIEF DESCRIPTION OF THE DRAWINGS

The disclosure, together with additional objectives, features and advantages thereof, will be best understood from the following description, the appended claims and the accompanying drawings in which:

DETAILED DESCRIPTION

Embodiments of the present disclosure will be described.
(First Embodiment)

Figure 2:
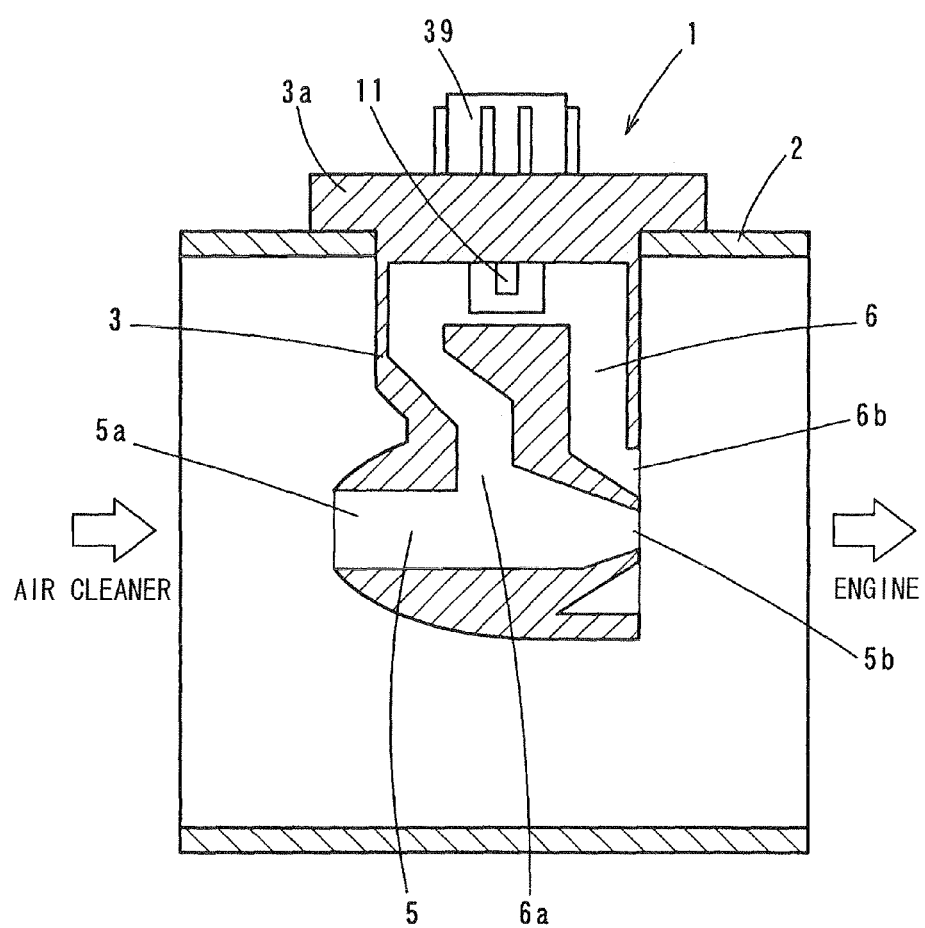
FIG. 2 is a sectional view illustrating a state in which the thermal type air flow meter is attached to an intake duct, according to the first embodiment.
Figure 3A:
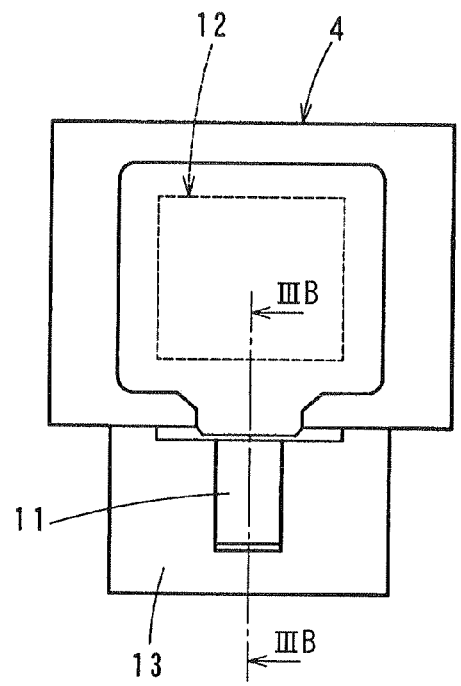
FIG. 3A is a plan view illustrating a flow rate sensor of the thermal type air flow meter according to the first embodiment.
Figure 3B:
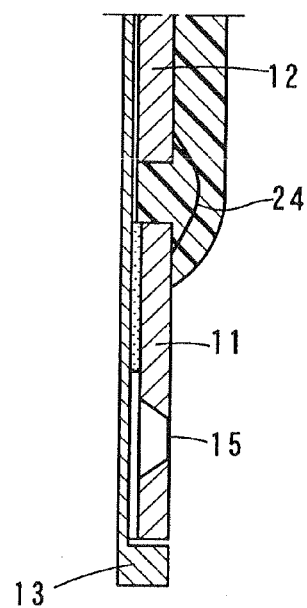
FIG. 3B is a sectional view taken along a line IIIB-IIIB of FIG. 3A.

In a first embodiment, an example of a thermal type air flow meter 1, which measures an air flow rate (referred to as an intake flow rate) of air drawn into an internal combustion engine of a vehicle, will be described below. As shown in FIGS. 2 and 3A, the thermal type air flow meter 1 includes a sensor hosing 3 attached to an intake duct 2 of the engine, and a flow rate sensor 4 supported by the sensor housing 3. The intake duct 2 is a part of an intake passage of the engine located upstream of a throttle valve (not shown) in an air flow direction, and the throttle valve adjusts an intake flow rate. Thus, the intake duct 2 is used, for example, as an outlet pipe of an air cleaner arranged at an upstream end of the intake passage in the air flow direction, or as an intake pipe connected to the outlet pipe of the air cleaner. The sensor housing 3 is inserted into the intake duct 2 from an attachment hole bored through a wall surface of the intake duct 2, and the sensor housing 3 is detachably fixed to the intake duct 2 via a flange part 3a of the sensor housing 3 by using a bolt or the like.

The sensor housing 3 defines therein a bypass passage for introducing thereinto a part of air drawn into the engine. That is, a part of air flowing from the air cleaner (i.e., an upstream side of the intake duct 2 in the air flow direction) toward the engine (i.e., a downstream side of the intake duct 2 in the air flow direction) is introduced into the bypass passage of the sensor housing 3. The bypass passage includes a first passage 5 through which a first inlet 5a communicates with a first outlet 5b, and a second passage (air passage) 6 into which a part of air flowing through the first passage 5 is introduced. The first inlet 5a opens toward the upstream side of the intake duct 2, and the first outlet 5b opens toward the downstream side of the intake duct 2. The first passage 5 has an almost straight shape between the first inlet 5a and the first outlet 5b, and the first passage 5 is tapered such that a downstream-side cross-section area of the first passage 5 in the air flow direction decreases gradually toward the first outlet 5b. A second inlet 6a branched from the first passage 5 communicates through the second passage 6 with a second outlet 6b which opens annularly around the first outlet 5b. The second passage 6 is greatly curved and longer than the first passage 5.

Figure 4:
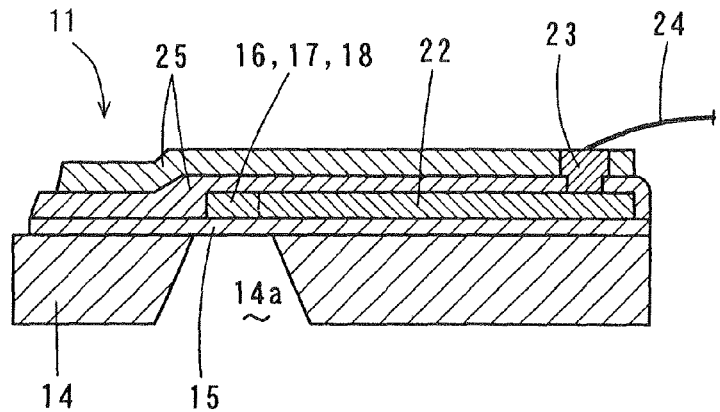
FIG. 4 is a sectional view illustrating a sensor chip of the flow rate sensor according to the first embodiment.

The flow rate sensor 4 includes a temperature control unit 7, a flow rate detection unit 8, a voltage supply unit 9 and a digital calculation unit 10, which are provided in a sensor chip (sensor portion) 11 and a circuit chip 12. The sensor chip 11 and the circuit chip 12 are accommodated in and integrated with a resin casing 13 so that the chips 11, 12 and the resin casing 13 constitute a sensor assembly. As shown in FIG. 4, in the sensor chip 11, a membrane 15 is provided on a part of a sensor substrate 14. The membrane 15 is an insulation film formed on a surface of the sensor substrate 14 by a sputtering method, a chemical vapor deposition (CVD) method or the like. A cavity part 14a is provided, for example, by an anisotropic etching, whereby a part of the sensor substrate 14 extending from an open surface of the sensor substrate 14 to a boundary surface between the sensor substrate 14 and the membrane 15, is removed.

Figure 5:
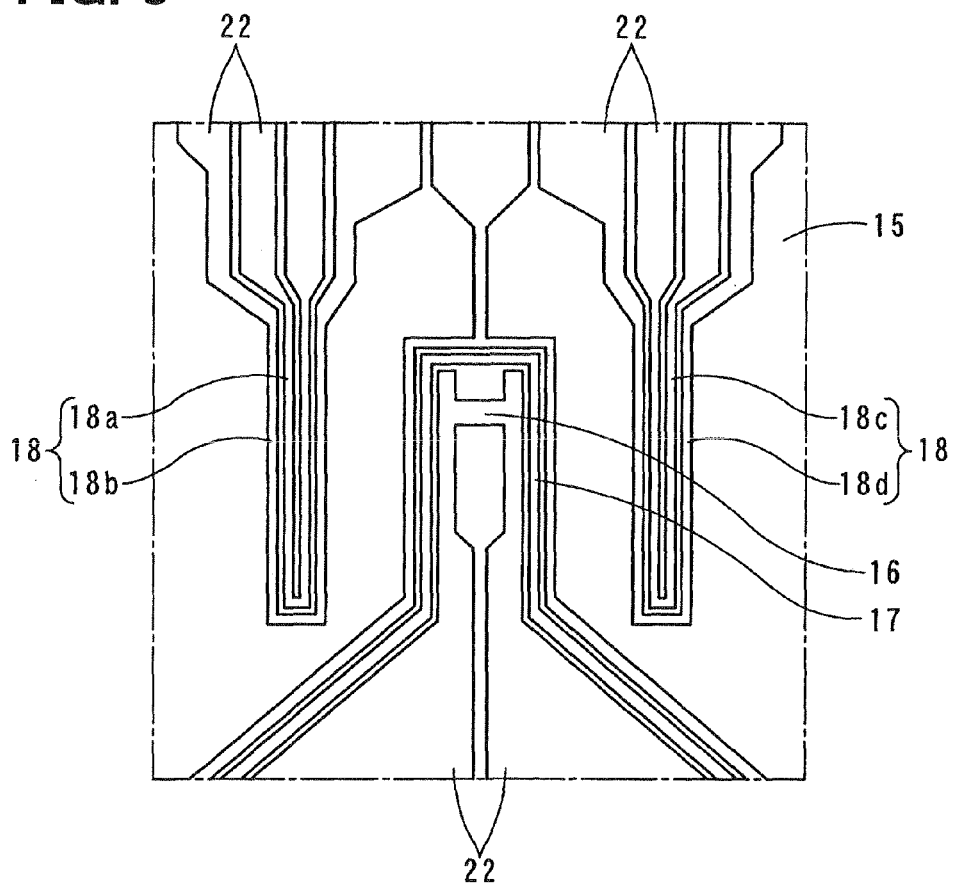
FIG. 5 is a plan view illustrating shapes of resistive elements arranged on a membrane of the sensor chip according to the first embodiment.
Figure 7:
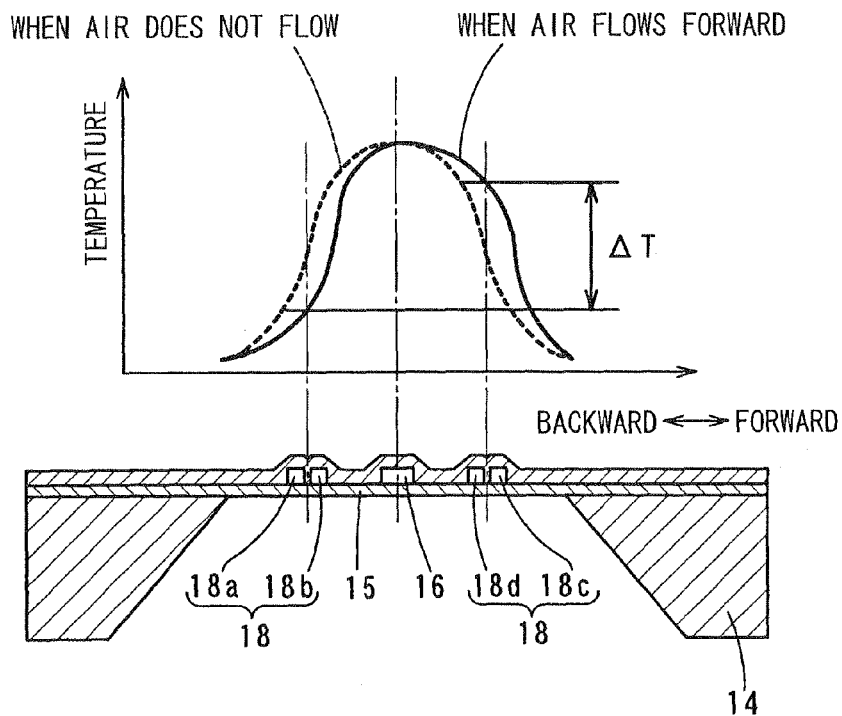
FIG. 7 is a diagram illustrating a correspondence relation between a diagram illustrating a temperature distribution on the sensor chip that indicates a principle of flow rate detection and a sectional view of the sensor chip taken along an air flow direction, according to the first embodiment.

As shown in FIG. 5, a heating element 16, a heater resistance temperature detector element (heater RTD element) 17 and a flow rate detection resistor 18 are arranged on the membrane 15. An air resistance temperature detector element (air RTD element) 19, a first resistive element 20 and a second resistive element 21 are arranged on an area other than an area of the membrane 15 on the sensor substrate 14. Here, at least one of the first and second resistive elements 20, 21 may be arranged on the area other than the area of the membrane 15 on the sensor substrate 14. The heating element 16 is arranged on an almost center part of the membrane 15, and is controlled to be a base temperature by the temperature control unit 7. The heater RTD element 17 is arranged in proximity to the heating element 16 so as to surround the heating element 16, and the heater RTD element 17 is configured to detect a temperature of the heating element 16. As shown in FIG. 7, the flow rate detection resistor 18 consists of an upstream resistance temperature detector element (upstream RTD element) 18 arranged upstream of the heating element 16 in an air flow direction in the second passage 6 (on the left side of the heating element 16 in FIG. 7), and a downstream resistance temperature detector element (downstream RTD element) 18 arranged downstream of the heating element 16 in the air flow direction. The upstream RTD element 18 includes first and second RTD elements 18a, 18b, and the downstream RTD element 18 includes first and second RTD elements 18c, 18d. The flow rate detection resistor 18 detects the air flow rate based on a detection temperature difference $\Delta T$ between the upstream RTD element 18 and the downstream RTD element 18. The heater RTD element 17 may correspond to a heater temperature detection resistor, and the air RTD element 19 may correspond to an air temperature detection resistor.

The air RTD element 19 is arranged on a thick part of the sensor substrate 14 not having the cavity part 14a, and is configured to detect a temperature of air (referred to as an intake temperature). The air RTD element 19 is located apart from the heating element 16 by a predetermined distance such that a temperature detection of the air RTD element 19 is prevented from being affected by heat from the heating element 16. Similar to the air RTD element 19, the first and second resistive elements 20 and 21 are also arranged on the thick part of the sensor substrate 14, and located apart from the heating element 16 by a predetermined distance so as not to be affected by heat from the heating element 16. In addition, it is to be noted that the first resistive element 20 and/or the second resistive element 21 may be provided on the circuit chip 12. The above-described heating element 16, the heater RTD element 17, the upstream and downstream RTD elements 18, the air RTD element 19, the first resistive element 20 and the second resistive element 21 can be made, for example, through their thin-film formation by a film formation technique, such as spattering or vapor deposition, and then their patterning with desired shapes by etching. Platinum can be used as materials of these resistive elements 16 to 21 because of high reliability of platinum.

As shown in FIG. 4, the resistive elements 16 to 21 are connected respectively to a printed wiring 22, and a bonding pad 23 is provided at an end part of the printed wiring 22. The bonding pad 23 is electrically connected to an electrode part (not shown) of the circuit chip 12 via a bonding wire 24. A protection film 25 is provided on a surface of the sensor chip 11 for protecting the resistive elements 16 to 21 and the printed wiring 22, such that only a surface of the bonding pad 23 is exposed on the surface of the sensor chip 11. In FIG. 4, the protection film 25 is two-layered, but may be one-layered. The sensor chip 11 is arranged so as to be exposed to air flowing in the second passage 6 as shown in FIG. 2.

Figure 1:
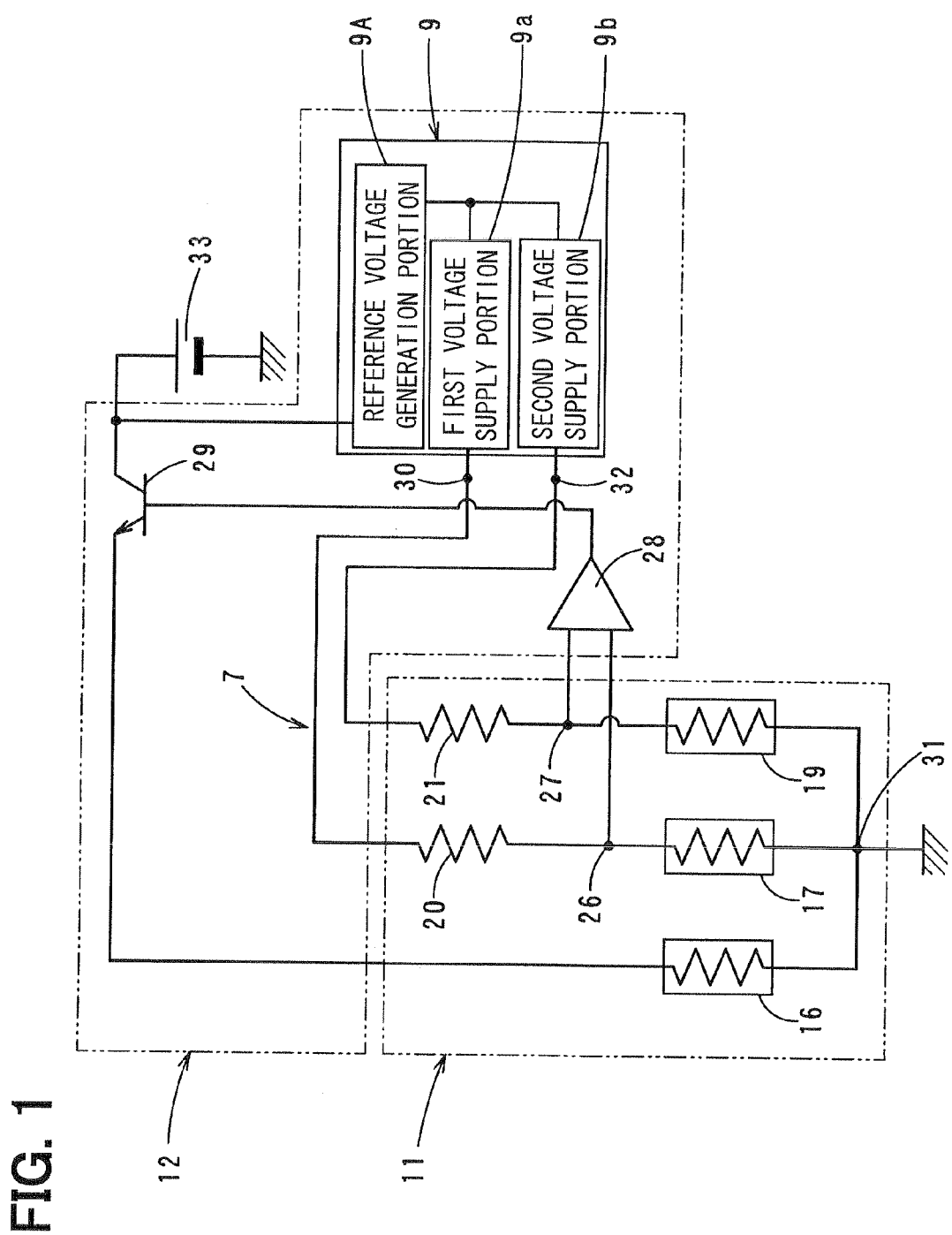
FIG. 1 is a circuit diagram illustrating a temperature control unit and a voltage supply unit of a thermal type air flow meter according to a first embodiment of the present disclosure.

As shown in FIG. 1, the temperature control unit 7 includes a bridge circuit having first and second arms, an operational amplifier 28 connected to two midpoint terminals 26, 27 of the bridge circuit, and a transistor 29 configured to be turned ON or OFF based on an output from the operational amplifier 28. The temperature control unit 7 controls the temperature of the heating element 16 to be the base temperature higher than the intake temperature by a predetermined degree (e.g., 200 degrees). The first arm of the bridge circuit of the temperature control unit 7 connects together a first feed terminal 30 and a ground terminal 31, and the second arm connects together a second feed terminal 32 and the ground terminal 31. The heater RTD element 17, which is configured to detect the temperature of the heating element 16, and the first resistive element 21 are serially arranged in the first arm. The air RTD element 19, which detects the intake temperature, and the second resistive element 21 are serially arranged in the second arm.

A temperature control of the heating element 16 is performed by the temperature control unit 7 as follows. When the temperature of the heating element 16 becomes lower than the base temperature, a resistance value of the heating element 16 reduces. Thus, a potential difference is generated between the two midpoint terminals 26, 27 of the bridge circuit, and the transistor 29 is thereby turned ON by an output from the operational amplifier 28. As a result, an electric current is supplied to the heating element 16 from an electric source 33 (refer to FIG. 1), and then the temperature of the heating element 16 increases. Subsequently, when the temperature of the heating element 16 increases to the base temperature, the potential difference between the two midpoint terminals 26, 27 becomes zero. Hence, equilibrium of the bridge circuit is maintained, and the transistor 29 is turned OFF, so that a supply of an electric current to the heating element 16 is stopped. Consequently, the temperature of the heating element 16 is maintained at the base temperature.

Figure 6:
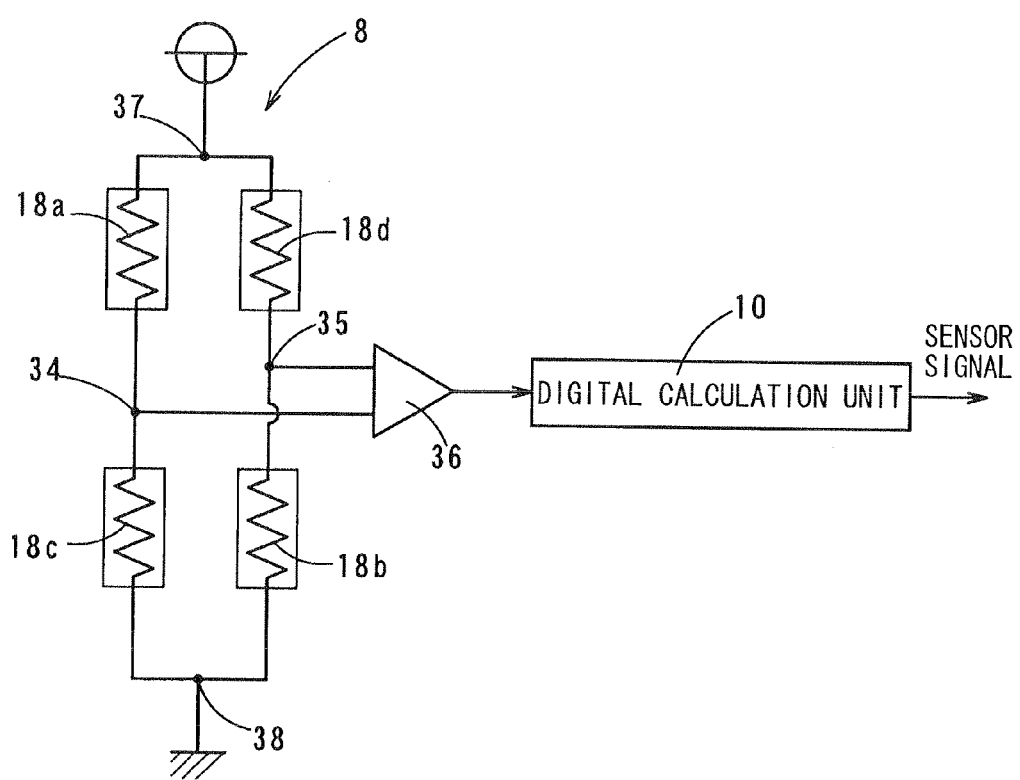
FIG. 6 is a circuit diagram illustrating a flow rate detection unit of the thermal type air flow meter according to the first embodiment.

As shown in FIG. 6, the flow rate detection unit 8 includes a bridge circuit including the four RTD elements 18a to 18d, and an operational amplifier 36 connected to two midpoint terminals 34, 35 of the bridge circuit. The flow rate detection unit 8 detects an intake flow rate based on the detection temperature difference $\Delta T$ between the upstream RTD element 18 (i.e., the first and second RTD elements 18a, 18b) and the downstream RTD element 18 (i.e., the first and second RTD elements 18c, 18d). The bridge circuit of the flow rate detection unit 8 includes two arms between a feed terminal 37, to which a predetermined voltage is applied, and a ground terminal 38 connected to a ground. In one of the two arms, the first RTD elements 18a upstream of the heating element 16 in the air flow direction and the first RTD element 18c downstream of the heating element 16 are arranged in series. In the other one of the two arms, the second RTD element 18d downstream of the heating element 16 and the second RTD element 18b upstream of the heating element 16 in the air flow direction are arranged in series.

A relation between a heat radiation amount from the heating element 16 and a detection temperature of the flow rate detection resistor 18 will be described referring to FIG. 7. When air does not flow in the second passage 6, as shown by a dashed line in the temperature distribution diagram of FIG. 7, a temperature distribution is symmetric with respect to a position of the heating element 16 between upstream and downstream side of the heating element 16 in the air flow direction. Thus, the detection temperature difference $\Delta T$ between the upstream RTD elements 18a, 18b and the downstream RTD elements 18c, 18d is zero. When air flows in the second passage 6 in a forward direction, a cooling effect due to the air flow is greater on the upstream RTD elements 18a, 18b than on the downstream RTD elements 18c, 18d. Hence, as shown by a solid line in the temperature distribution diagram of FIG. 7, the temperature is lopsidedly distributed toward the downstream side of the heating element 16 in the air flow direction (i.e., toward the right side in FIG. 7). That is, the upstream RTD elements 18a, 18b are lower than the downstream RTD elements 18c, 18d in the detection temperature. When air flows in the second passage 6 in a backward direction, the temperature is lopsidedly distributed toward the upstream side of the heating element 16 in the air flow direction, and the upstream RTD elements 18a, 18b becomes higher than the downstream RTD elements 18c, 18d in the detection temperature.

Figure 8:
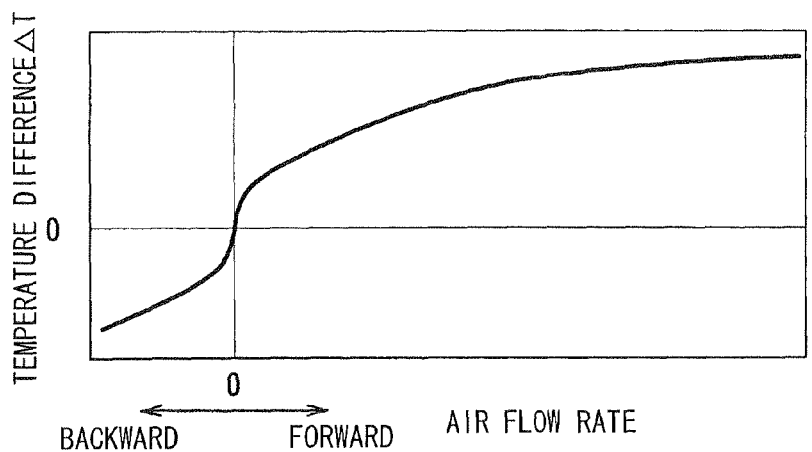
FIG. 8 is a diagram illustrating an output characteristic of the thermal type air flow meter according to the first embodiment.

Accordingly, as shown in FIG. 8, when air flows in the second passage 6, the detection temperature difference $\Delta T$ between the upstream RTD elements 18a, 18b and the downstream RTD elements 18c, 18d is produced and increased in accordance with the air flow direction and the air flow rate (intake flow rate). Therefore, the intake flow rate and the air flow direction can be detected based on this detection temperature difference $\Delta T$. When the detection temperature difference $\Delta T$ between the upstream RTD elements 18a, 18b and the downstream RTD elements 18c, 18d is produced, i.e., when a potential difference between the two midpoint terminals 34, 35 of the bridge circuit of the flow rate detection unit 8 is produced due to respective changes of resistance values of the upstream RTD elements 18a, 18b and downstream RTD elements 18c, 18d the potential difference is amplified by the operational amplifier 36 to be outputted to the digital calculation unit 10 (see FIG. 6).

As shown in FIG. 1, the voltage supply unit 9 includes a reference voltage generation portion 9A which produces a reference voltage from a source voltage, a first voltage supply portion 9a which produces a first voltage and a second voltage based on the reference voltage and applies the first voltage to the first feed terminal 30, and a second voltage supply portion 9b which applies the second voltage to the second feed terminal 32. At least one of the first and second voltage supply portions 9a, 9b may be used as a voltage adjusting portion of the present disclosure, which is configured to be capable of adjusting a supply voltage to the resistive elements 17, 19, 20, 21. The supply voltage is adjusted by inputting an electrical signal from outside to a trim terminal (not shown) of a connector 39 and then writing data into a memory of the circuit chip 12, such as an erasable programmable read only memory (EPROM), so that a predetermined voltage is obtained. Here, the connector 39 is formed by resin molding integrally with the flange 3a shown in FIG. 2, and the trim terminal is provided inside the connector 39. The memory of the circuit chip 12 is incorporated into the circuit chip 12.

The digital calculation unit 10 shown in FIG. 6 includes an analog-digital converter (A/D converter) in which an electrical signal (analog signal) corresponding to an intake flow rate detected by the flow rate detection unit 8 is converted to a digital signal, a memory in which a correction map having data for a temperature correction is stored, a correction portion which corrects a shift of a temperature characteristic based on the correction map stored in the memory, and a signal output portion which converts a temperature-corrected voltage to a frequency and outputs the frequency as a sensor signal to an outside electronic control unit (ECU) (not shown). The signal output portion may output the temperature-corrected voltage to the ECU without converting the voltage to the frequency. The digital calculation unit 10 and the voltage supply unit 9 are provided on a substrate of the circuit chip 12.

An operation and effects of the first embodiment will be described. In the thermal type air flow meter 1 of the present embodiment, at least one of the first and second voltage supply portions 9a, 9b is used as the voltage adjusting portion of the present disclosure. Thus, at least one of the first voltage applied to the first arm of the bridge circuit of the temperature control unit 7 via the first feed terminal 30 and the second voltage applied to the second arm via the second feed terminal 32 can be adjusted to be a predetermined voltage by an electrical signal inputted from outside via the trim terminal. Therefore, a similar effect to a case, for example, in which the resistive elements 20, 21 are trimmed by using laser or the like, can be obtained by performing the above-described voltage adjustment, even if both the first and second resistive elements 20, 21 of the bridge circuit of the temperature control unit 7 have a variation in a resistance temperature coefficient.

Thus, a detection temperature difference between the heater RTD element 17 and the air RTD element 19 can be maintained at a constant by adjusting at least one of the first and second voltages. In other words, the temperature of the heating element 16 can be controlled to be the base temperature higher than the intake temperature by a predetermined degree, so that an air flow rate can be detected with high accuracy based on a heat radiation amount from the heating element 16. Additionally, a change and variation of flow rate characteristic of the resistive elements due to deterioration and defacement thereof can be limited. Thus, for each individual (product), a variation in the detection temperature difference can be adjusted easily.

When a resistive element is trimmed by using laser or the like, characteristics of resistive elements may be varied in production processes (e.g., protection with a silicone gel or the like, and covering with a cover) after the trimming. However, in the thermal type air flow meter 1 of the present embodiment, voltage adjustment can be performed in a finalized state of the thermal type air flow meter 1, i.e., after product assembly of the thermal type air flow meter 1 since the thermal type air flow meter includes the trim terminal, into which the electrical signal from outside is inputted, inside the connector 39. Hence, the thermal type air flow meter 1 having high detection accuracy can be provided without changing characteristics of the resistive elements. Furthermore, there is no need to use an expensive equipment for performing laser trimming, and manufacturing cost can be thereby reduced.

(Second Embodiment)

Figure 9:
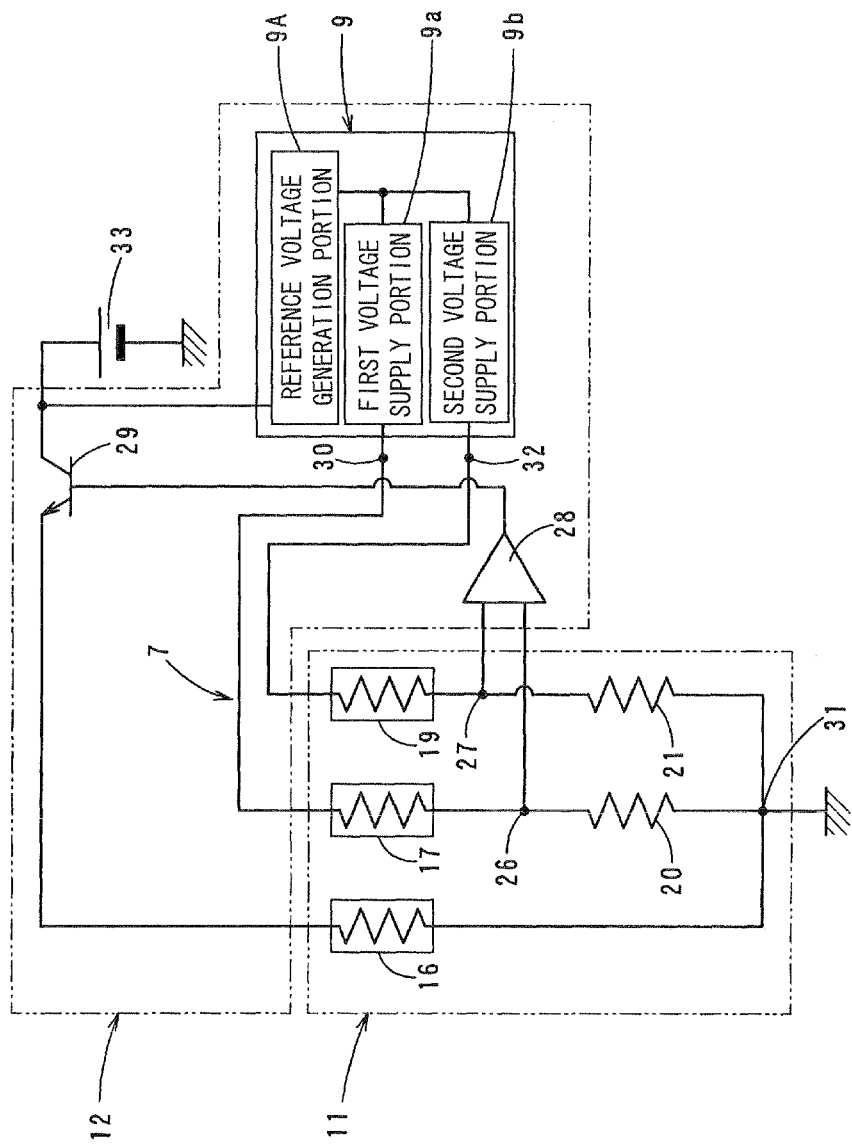
FIG. 9 is a circuit diagram illustrating a temperature control unit and a voltage supply unit of a thermal type air flow meter according to a second embodiment of the present disclosure.
Figure 10:
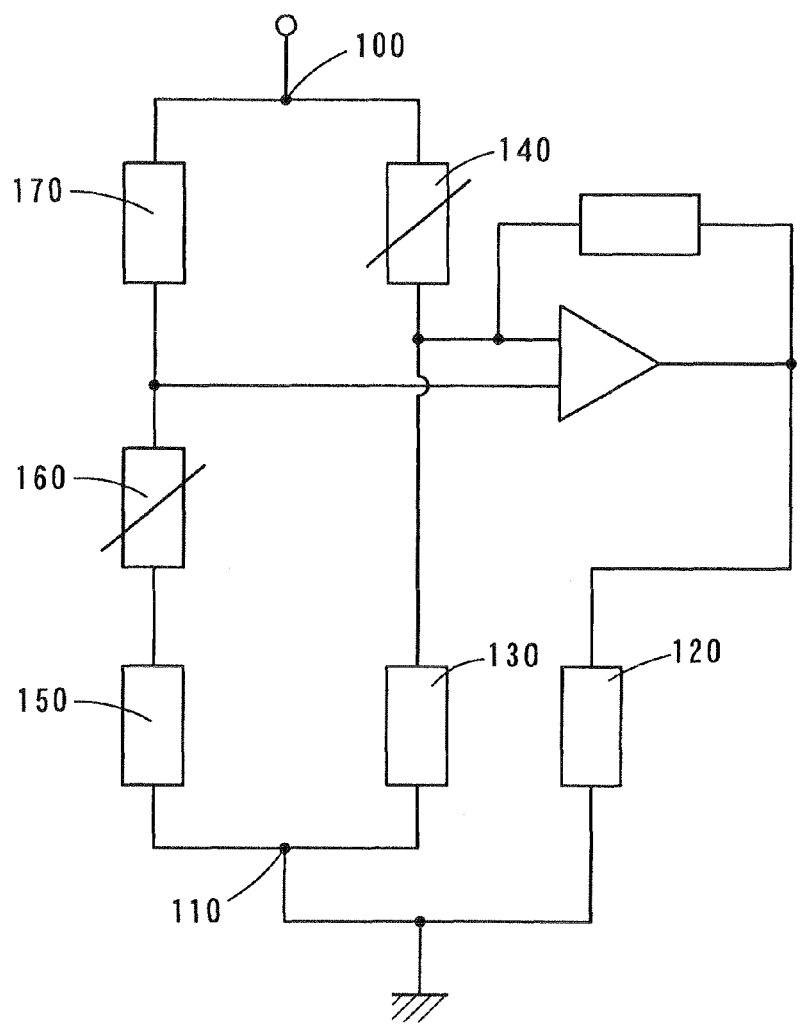
FIG. 10 is a circuit diagram illustrating a bridge circuit which controls a temperature of a heating element, according to a conventional technology.
Figure 11:
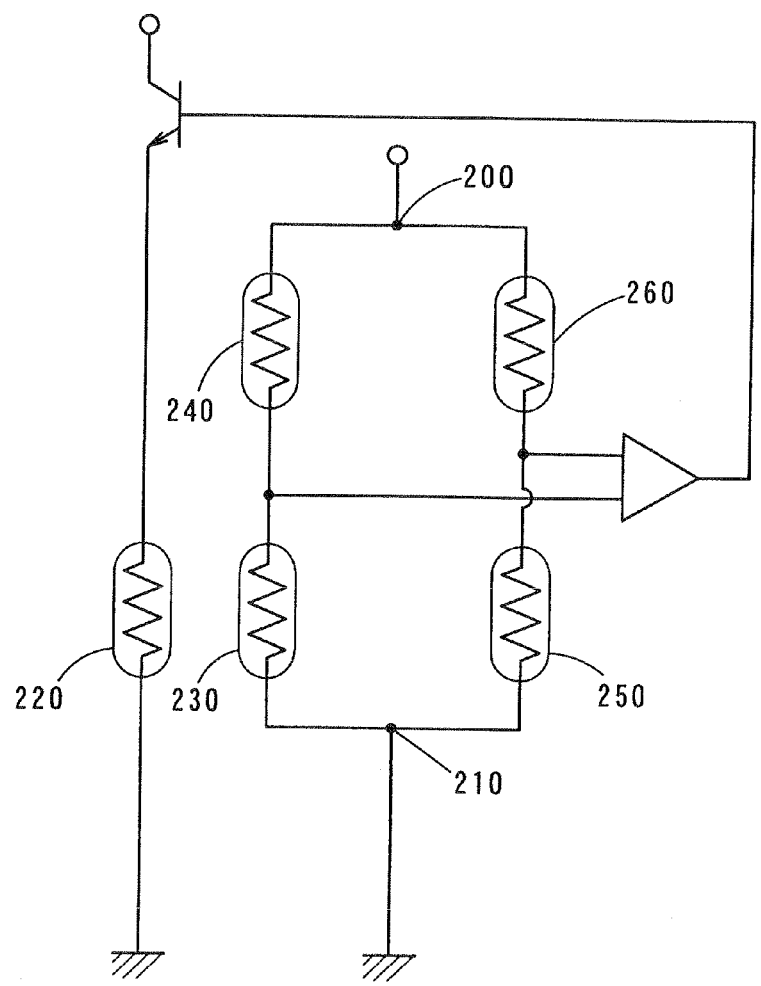
FIG. 11 is a circuit diagram illustrating a bridge circuit which controls a temperature of a heating element, according to a conventional technology.

A thermal type air flow meter 1 of a second embodiment is different from the thermal type air flow meter 1 of the first embodiment in arrangements of a heater RTD element 17 and a first resistive element 20 which are connected to a first arm of a bridge circuit of a temperature control unit 7, and in arrangements of an air RTD element 19 and a second resistive element 21 which are connected to a second arm of the bridge circuit. That is, as shown in FIG. 9, in the second embodiment, the heater RTD element 17 and the first resistive element 20 are arranged in series in the first arm such that the heater RTD element 17 is nearer to a first feed terminal 30 and farther from a ground terminal 31 than the first resistive element 20. The air RTD element 19 and the second resistive element 21 are arranged in series in the second arm such that the air RTD element 19 is arranged nearer to a second feed terminal 32 and farther from the ground terminal 31 than the second resistive element 21. In the above-described configuration of the second embodiment, a first voltage is supplied to the first arm via the first feed terminal 30 from a voltage supply unit 9, and a second voltage is supplied to the second arm via the second feed terminal 32 from the voltage supply unit 9.

At least one of the first and second voltages is adjustable so that detection temperature difference between the heater RTD element 17 and the air RTD element 19 is maintained at a constant. Similar to the first embodiment, the voltage adjustment is performed by inputting an electrical signal from outside to a trim terminal and then writing data into a memory such as an EPROM, so that a predetermined voltage is obtained. Hence, the second embodiment is different from the first embodiment only in arrangements of the heater RTD element 17 and the first resistive element 20 which are connected to the first arm of the bridge circuit of the temperature control unit 7, in arrangements of the air RTD element 19 and the second resistive element 21 which are connected to the second arm of the bridge circuit. The detection temperature difference between the heater RTD element 17 and the air RTD element 19 is controlled so as to be constant by adjusting at least one of the first and second voltages. Therefore, a similar effect to the first embodiment can be obtained in the second embodiment.

A modification of the present disclosure will be described. The thermal type air flow meter 1 in the first embodiment detects an air flow rate based on the detection temperature difference $\Delta T$ between the upstream RTD element (i.e., the first and second RTD elements 18a, 18b) arranged upstream of the heating element 16 and the downstream RTD element (i.e., the first and second RTD elements 18c, 18d) arranged downstream of the heating element 16. However, the present disclosure may be applied to a thermal type air flow meter, which includes at least two heating elements 16 arranged on a membrane 15 of a sensor chip 11. The thermal type air flow meter detects an air flow rate based on a difference between a heat radiation amount from one of the heating elements 16 arranged upstream side in the air flow direction and a heat radiation amount from one of the heating elements 16 arranged downstream side in the air flow direction.

To sum up, the thermal type air flow meter 1 of the above embodiments may be described as follows.

The thermal type air flow meter 1 is adapted to be attached to the duct 2. The air flow meter 1 includes the sensor portion 11, the temperature control unit 7 and the flow rate detection unit 8. The sensor portion 11 is arranged in the air passage 6 in the duct 2 through which air flows, and includes the heating element 16 configured to produce heat by energization thereof. The temperature control unit 7 is configured to control the temperature of the heating element 16 such that the temperature difference between the temperature of the heating element 16 and the temperature of air flowing in the air passage 6 becomes constant. The temperature control unit 7 includes the heater temperature detection resistor 17 configured to detect the temperature of the heating element 16, the first resistive element 20, the first arm serially connecting the heater temperature detection resistor 17 and the first resistive element 20, the air temperature detection resistor 19 configured to detect the temperature of air flowing in the air passage 6, the second resistive element, the second arm serially connecting the air temperature detection resistor 19 and the second resistive element 21, and the voltage supply unit 9a, 9b configured to supply a first voltage to the first arm, and to supply a second voltage to the second arm. The flow rate detection unit 8 is configured to detect a flow rate of air flowing in the air passage 6 based on a heat radiation amount from the heating element 16. The voltage supply unit 9a, 9b includes a voltage adjusting portion 9a, 9b which is capable of adjusting at least one of the first voltage and the second voltage such that the temperature difference between the temperature detected by the heater temperature detection resistor 17 and the temperature detected by the air temperature detection resistor 19 becomes constant.

According to the above-described description, at least one of the first and second voltages can be adjusted by the voltage adjusting portion 9a, 9b. Thus, a similar effect to the case, in which resistance values of the first and second resistive elements 20, 21 are adjusted by laser trimming, can be obtained. That is, the temperature of the heating element 16 can be controlled such that the detection temperature difference between the heater temperature detection resistor 17 and the air temperature detection resistor 19 becomes constant, i.e., the temperature difference between the temperature of the heating element 16 and the temperature of air can be controlled to be constant. Therefore, an air flow rate can be detected with high accuracy based on a heat radiation amount from the heating element 16. Moreover, a change and variation of a flow rate characteristic of the resistive elements due to deterioration and defacement thereof can be limited. Thus, for each individual (product), a variation in the detection temperature difference can be adjusted easily.

The thermal type air flow meter 1 may further include the circuit chip 12 having the substrate on which the temperature control unit 7 and the flow rate detection unit 8 are circuit-configured. The voltage adjusting portion 9a, 9b may be capable of adjusting at least one of the first voltage and the second voltage by inputting an electrical signal from outside into the circuit chip 12 and then writing data, which is made from the electrical signal, to a memory incorporated into the circuit chip 12. The voltage adjusting portion 9a, 9b can perform voltage adjustment after product assembly of the thermal type air flow meter 1. In other words, the voltage adjusting portion 9a, 9b can adjust a voltage by writing data into the memory such as the EPROM based on the electrical signal from outside in the finalized state of the thermal type air flow meter 1. In this case, characteristics of the resistive elements may not change. Hence, the thermal type air flow meter 1 having high detection accuracy can be provided. Furthermore, there is no need to use an expensive equipment for performing laser trimming, and manufacturing cost can be thereby reduced.

The sensor portion 11 may include the sensor chip 11 having the substrate 14 and the membrane 15 which is provided on a part of the substrate 14. The heating element 16 and the heater temperature detection resistor 17 may be arranged on the membrane 15. The air temperature detection resistor 19 may be arranged on the sensor chip 11 other than the area of the membrane 15. By arranging the heating element 16 and the heater RTD element 17 on the membrane 15 having a relatively low thermal capacity, a supply voltage to the heating element 16 can be set to be low.

At least one of the first resistive element 20 and the second resistive element 21 may be arranged on the sensor chip 11 other than the area of the membrane 15. In this case, at least one of the first and second resistive elements 20, 21 can be formed in a manufacturing process of the heating element 16 and the heater RTD element 17. Thus, a variation in a resistance ratio among the resistive elements can be reduced, and a variation range of a detection temperature difference can be thereby made to be small. Therefore, the detection temperature difference can be adjusted with high accuracy.

The thermal type air flow meter may further include a common casing 13, and the circuit chip 12 and the sensor chip 11 may be integrally accommodated in the casing 13 so that the circuit chip 12, the sensor chip 11 and the casing 13 are configured as a sensor assembly. In this case, because the sensor chip 11 and the circuit chip 12 are accommodated in the common casing 13, wiring between the sensor chip 11 and the circuit chip 12 can be connected easily. Moreover, because the chips 11, 12 and the casing 13 are configured as the single sensor assembly, miniaturization of the thermal type air flow meter 1 can be provided.

The sensor portion 11 may include the upstream resistance temperature detector element 18a, 18b arranged on the upstream side of the heating element 16 in the flow direction of air flowing in the air passage 6 to detect a temperature of air flowing on the upstream side of the heating element 16, and the downstream resistance temperature detector element 18c, 18d arranged on the downstream side of the heating element 16 in the flow direction of air flowing in the air passage 6 to detect a temperature of air flowing on the downstream side of the heating element. The flow rate detection unit 8 may detect the flow rate of air flowing in the air passage 6 based on the temperature difference $\Delta T$ between the temperature detected by the upstream resistance temperature detector element 18a, 18b and the temperature detected by the downstream resistance temperature detector element 18c, 18d. Because the resistance temperature detector elements are arranged both on the upstream side and the downstream side of the heating element 16 in the air flow direction, the thermal type air flow meter 1 can detect not only a flow rate of air flowing from the upstream side to the downstream side of the heating element 16 (in the forward direction), but also a flow rate of air flowing from the downstream side to the upstream side of the heating element 16 (in the backward direction). Thus, when the thermal type air flow meter 1 of the present disclosure is applied to, for example, an air flow meter which measures a flow rate of intake air drawn into an engine of a vehicle, the air flow meter can detect not only a flow rate of intake air in a direction of suction into the engine, but also a rate of counter flow air caused by intake pulsation or the like.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A thermal type air flow meter adapted to be attached to a duct, the air flow meter comprising:
   a sensor portion arranged in an air passage in the duct through which air flows, the sensor portion including a heating element configured to produce heat by energization thereof;
   a temperature control unit configured to control a temperature of the heating element such that a temperature difference between the temperature of the heating element and a temperature of air flowing in the air passage becomes constant, the temperature control unit including:
      a heater temperature detection resistor configured to detect the temperature of the heating element;
      a first resistive element;
      a first arm serially connecting the heater temperature detection resistor and the first resistive element;
      an air temperature detection resistor configured to detect the temperature of air flowing in the air passage;
      a second resistive element;
      a second arm serially connecting the air temperature detection resistor and the second resistive element; and
      a voltage supply unit configured to supply a first voltage to the first arm, and to supply a second voltage to the second arm; and
   a flow rate detection unit configured to detect a flow rate of air flowing in the air passage based on a heat radiation amount from the heating element, wherein
      the voltage supply unit includes a voltage adjusting portion which is capable of adjusting at least one of the first voltage and the second voltage such that the temperature difference between the temperature detected by the heater temperature detection resistor and the temperature detected by the air temperature detection resistor becomes constant.

2. The thermal type air flow meter according to claim 1, further comprising
   a circuit chip having a substrate on which the temperature control unit and the flow rate detection unit are circuit-configured, wherein
   the voltage adjusting portion is capable of adjusting at least one of the first voltage and the second voltage by inputting an electrical signal from outside into the circuit chip and then writing data, which is made from the electrical signal, to a memory incorporated into the circuit chip.

3. The thermal type air flow meter according to claim 2, wherein:
   the sensor portion includes a sensor chip having a substrate and a membrane, which is provided on a part of the substrate;
   the heating element and the heater temperature detection resistor are arranged on the membrane; and
   the air temperature detection resistor is arranged on the sensor chip other than an area of the membrane.

4. The thermal type air flow meter according to claim 3, wherein
   at least one of the first resistive element and the second resistive element is arranged on the sensor chip other than the area of the membrane.

5. The thermal type air flow meter according to claim 3, further comprising a common casing, wherein the circuit chip and the sensor chip are integrally accommodated in the casing so that the circuit chip, the sensor chip and the casing are configured as a sensor assembly.

6. The thermal type air flow meter according to claim 1, wherein
   the sensor portion includes an upstream resistance temperature detector element arranged on an upstream side of the heating element in a flow direction of air flowing in the air passage to detect a temperature of air flowing on the upstream side of the heating element, and a downstream resistance temperature detector element arranged on a downstream side of the heating element in the flow direction of air flowing in the air passage to detect a temperature of air flowing on the downstream side of the heating element; and
   the flow rate detection unit detects the flow rate of air flowing in the air passage based on a temperature difference between the temperature detected by the upstream resistance temperature detector element and the temperature detected by the downstream resistance temperature detector element.

* * * * *